(12) United States Patent
Foust et al.

(10) Patent No.: US 8,495,883 B2
(45) Date of Patent: Jul. 30, 2013

(54) COOLING OF TURBINE COMPONENTS USING COMBUSTOR SHELL AIR

(75) Inventors: Adam M. Foust, Orlando, FL (US); Raymond S. Nordlund, Orlando, FL (US); Nitin Chhabra, Oviedo, FL (US); David A. Little, Chuluota, FL (US)

(73) Assignee: Siemens Energy, Inc., Orlando, FL (US)

( * ) Notice: Subject to any disclaimer, the term of this patent is extended or adjusted under 35 U.S.C. 154(b) by 820 days.

(21) Appl. No.: 12/700,005

(22) Filed: Feb. 4, 2010

(65) Prior Publication Data

US 2010/0175387 A1 Jul. 15, 2010

Related U.S. Application Data

(63) Continuation-in-part of application No. 11/784,150, filed on Apr. 5, 2007, now Pat. No. 8,015,826.

(51) Int. Cl.
  *F02C 6/08* (2006.01)
(52) U.S. Cl.
  USPC ............ 60/782; 60/785; 60/795; 60/39.23; 60/806
(58) Field of Classification Search
  USPC ............. 60/782, 785, 806, 795, 805, 39.23
  See application file for complete search history.

(56) References Cited

U.S. PATENT DOCUMENTS

| | | | | |
|---|---|---|---|---|
| 4,967,552 A * | 11/1990 | Kumata et al. | | 60/806 |
| 5,003,768 A * | 4/1991 | Kappler et al. | | 60/39.23 |
| 5,394,687 A * | 3/1995 | Chen et al. | | 60/785 |
| 5,537,864 A | 7/1996 | Sood | | |
| 5,581,996 A | 12/1996 | Koch et al. | | |
| 6,065,282 A * | 5/2000 | Fukue et al. | | 60/39.182 |
| 6,120,249 A * | 9/2000 | Hultgren et al. | | 416/97 R |
| 6,250,061 B1 * | 6/2001 | Orlando | | 60/772 |
| 6,311,474 B2 * | 11/2001 | Muyama et al. | | 60/39.55 |
| 6,487,863 B1 * | 12/2002 | Chen et al. | | 60/782 |
| 6,672,072 B1 | 1/2004 | Giffin, III | | |
| 6,860,109 B2 * | 3/2005 | Tsuji | | 60/806 |
| 6,968,696 B2 | 11/2005 | Little | | |
| 7,000,404 B2 * | 2/2006 | Palmisano et al. | | 60/782 |
| 7,708,518 B2 * | 5/2010 | Chehab | | 415/115 |
| 8,307,662 B2 * | 11/2012 | Turco | | 60/782 |
| 2005/0050901 A1 | 3/2005 | Little | | |

FOREIGN PATENT DOCUMENTS

| | | |
|---|---|---|
| EP | 1528238 A2 | 5/2005 |
| EP | 1967717 A1 | 9/2008 |
| WO | 2008123904 A2 | 10/2008 |

* cited by examiner

*Primary Examiner* — William H Rodriguez

(57) ABSTRACT

A turbine engine assembly for a generator including a turbine engine having a compressor section, a combustor section and a turbine section. An air bleed line is in communication with the combustor section for receiving combustor shell air from the combustor section and conveying the combustor shell air as bleed air to a plurality of stages of the turbine section. Bleed air is controlled to flow through the air bleed line when an operating load of the turbine engine assembly is less than a base load of the engine to bypass air exiting the compressor section around a combustor in the combustor section and effect a flow of high pressure combustor shell air to the stages of the turbine section.

20 Claims, 4 Drawing Sheets

COOLING OF TURBINE COMPONENTS USING COMBUSTOR SHELL AIR

CROSS REFERENCE TO RELATED APPLICATION

This application is A CONTINUATION-IN-PART APPLICATION of and claims priority to U.S. patent application Ser. No. 11/784,150, filed on Apr. 5, 2007, now U.S. Pat. No. 8,015,826 entitled "ENGINE BRAKE FOR PART LOAD CO REDUCTION," the entire disclosure of which is incorporated by reference herein.

FIELD OF THE INVENTION

The present invention relates generally to turbine engines and, more particularly, to cooling of turbine parts during low load operation of a turbine.

BACKGROUND OF THE INVENTION

Turbine engines, such as single shaft industrial gas turbines, are designed to operate at a constant design turbine inlet temperature under any ambient air temperature (i.e., the compressor inlet temperature). This design turbine inlet temperature allows the engine to produce maximum possible power, known as base load. Any reduction from the maximum possible base load power is referred to as part load operation. In other words, part load entails all engine operation from 0% to 99.9% of base load power.

Part load operation may result in the production of high levels of carbon monoxide (CO) during combustion. One known method for reducing part load CO emissions is to bring the combustor exit temperature or the turbine inlet temperature near that of the base load design temperature. It should be noted that, for purposes of this disclosure, the terms combustor exit temperature and turbine inlet temperature are used interchangeably. In actuality, there can be from about 30 to about 80 degrees Fahrenheit difference between these two temperatures due to, among other things, cooling and leakage effects occurring at the transition/turbine junction. However, with respect to aspects of the present invention, this temperature difference is insubstantial.

To bring the combustor exit temperature closer to the base load design temperature, mass flow of air through a turbine engine 10 (FIG. 5) can be restricted by closing the compressor inlet guide vanes (IGV) (not shown), which act as a throttle at the inlet of the compressor 12. When the IGVs are closed, the trailing edges of the vanes rotate closer to the surface of an adjacent vane, thereby effectively reducing the available throat area. Reducing the throat area reduces the flow of air which the first row of rotating blades can draw into the compressor. Lower flow to the compressor leads to a lower compressor pressure ratio being established in the turbine section 14 of the engine 10. Consequently, the compressor exit temperature decreases because the compressor 12 does not input as much energy into the incoming air. Also, the mass flow of air through the turbine 10 decreases, and the combustor exit temperature increases.

Typically, some of the compressor exit air 16 from the combustor shell 18 is used as cooling air supplied directly to structure 20 of the turbine 10 adjacent to the first row of blades 22a. This structure can include the outer casing, blade rings, and ring segments. In addition, some compressed air, comprising compressor bleed air, may be piped directly out of the compressor through piping 24b, 24c, 24d. This compressor bleed air is directed to structure, e.g., stationary vane structure 26b, 26c, 26d, near second, third and fourth row blades 22b, 22c, 22d, within respective second, third and fourth stages 28b, 28c, 28d of the turbine section 14.

CO increases rapidly as gas turbine engine load is reduced below approximately 60%. Once the IGVs have been closed to their limit, and the engine's exhaust temperature limit has been reached, then power typically may be reduced only by decreasing turbine inlet temperature (TIT). TIT reduction corresponds to a decrease in the combustion system's primary zone temperature (T_PZ), resulting in CO and unburned hydrocarbons (UHC) being produced due to quenching of the combustion reactions in the turbine hot gas path. To prevent CO from increasing as engine load decreases, the T_PZ must be maintained at a high level.

SUMMARY OF THE INVENTION

In accordance with one aspect of the invention, a turbine engine assembly for a generator is provided. The assembly comprises a turbine engine having a compressor section, a combustor section and a turbine section. The combustor section includes a primary zone temperature (T_PZ) and the turbine engine includes a base load. At least one air bleed line is in communication with the combustor section for receiving bleed air comprising combustor shell air from the combustor section. The at least one air bleed line is also in communication with a second stage of the turbine section and in communication with one or more stages of the turbine section downstream from the second stage for supplying bleed air to the turbine section. At least one valve is provided for controlling air flow through the at least one air bleed line, and a controller is provided for opening the at least one valve to allow bleed air to flow through the at least one air bleed line when an operating load is less than the base load to bypass air exiting the compressor section around a combustor in the combustor section and effect a flow of high pressure combustor shell air to the stages of the turbine section.

In accordance with another aspect of the invention, a cooling system is provided for a turbine engine operably coupled to a generator. The system comprises an air bleed line in communication with a combustor section of the turbine engine, and in communication with a turbine section of the turbine engine. A flow control device is provided for controlling flow through the air bleed line. A controller is provided for actuating the flow control device to allow bleed air to flow through the air bleed line and provide cooling air to the turbine section when an operating load is less than a base load of the turbine engine, wherein substantially all cooling air for the turbine section is obtained from compressor exit air exiting a compressor section of the turbine engine.

In accordance with a further aspect of the invention, a method of operating a turbine engine assembly is provided. The method comprises sensing a load on a turbine engine for a reduced operating load; and bleeding air from a combustor section of the turbine engine to provide bleed air to a turbine section of the turbine engine responsive to the reduced load, wherein substantially all bleed air for the turbine section is obtained from compressor exit air discharged from a compressor section of the turbine engine.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
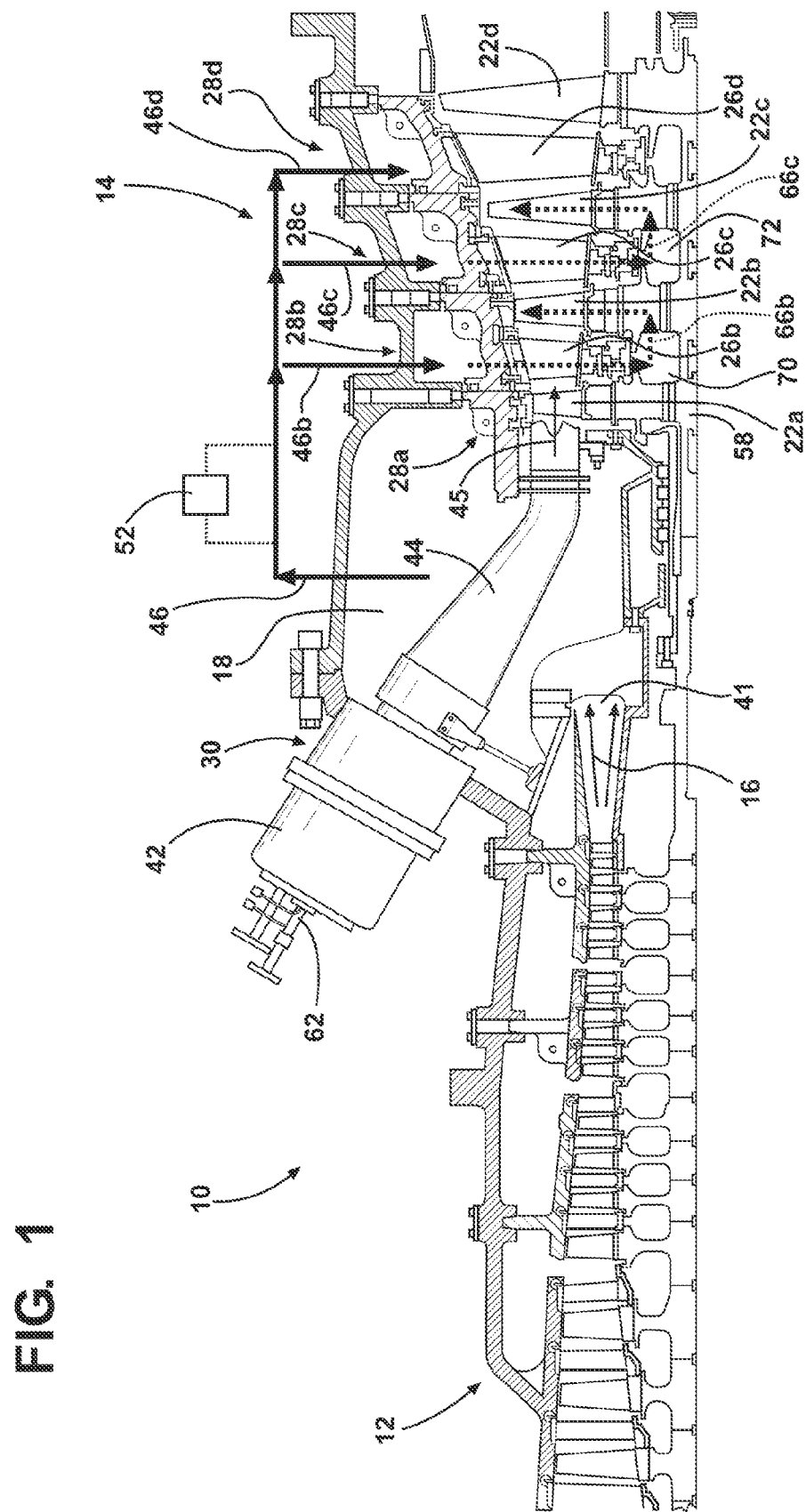
FIG. 1 is a cross-sectional view of a turbine engine assembly illustrating an exemplary embodiment of the invention.
Figure 2:
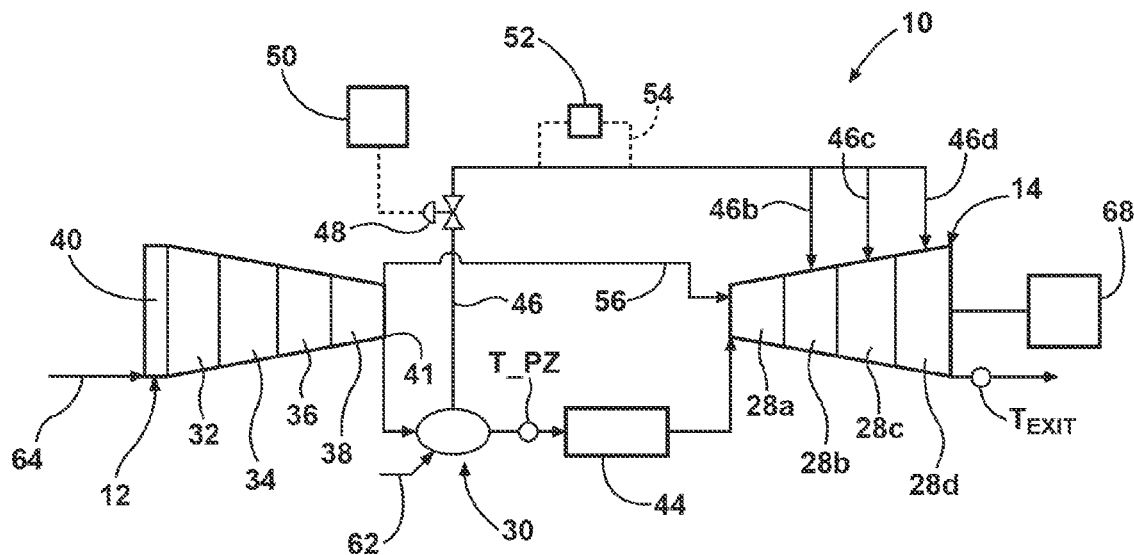
FIG. 2 is a schematic diagram of a turbine engine assembly corresponding to FIG. 1.

Referring initially to FIGS. 1 and 2, embodiments of the invention are directed to a turbine engine assembly 10 having a compressor section 12, a combustor section 30, and a turbine section 14. As is known in the art, the compressor section 12 can have one or more stages such as front stages 32, forward stages 34, middle stages 36, and rear stages 38 (FIG. 2). Also, the compressor section 12 can have inlet guide vanes (IGVs) 40 which can be opened and closed or otherwise adjusted to control the mass flow of air into the compressor section 12. It should be understood that the turbine engine assembly 10 can have other vane assemblies and other assemblies that provide for flow control, including variable stator vanes.

The combustor section 30 includes a combustor shell 18 (FIG. 1) for receiving compressor exit air 16 (also known as combustor shell air) passing from a compressor exit 41, and a combustor 42 for receiving and mixing fuel with combustor shell air and igniting the air/fuel mixture to produce hot working gases for producing power in the turbine section 14. It may be noted that although the combustor section 30 is shown as including a single combustor 42, the combustor section 30 may comprise a plurality of combustors 42, as is typical in most turbine engines. A transition section or structure 44 can be provided for directing the hot working gas from the combustor 42 to a turbine section inlet at a first stage 28a of the turbine section 14 for passing through a hot gas path 45. The turbine section 14 comprises a plurality of stages including the first stage 28a, a second stage 28b, a third stage 28c, and a fourth stage 28d.

In the turbine engine assembly 10, piping, e.g., external piping, can be used to remove an air stream comprising compressor exit air 16, i.e., combustor shell air, from the combustor shell 18, to put such air stream to use elsewhere in the turbine engine 10, such as, for example, cooling of various components. In particular, an air bleed line 46 may be in fluid communication with the interior of the combustor shell 18 for receiving bleed air comprising the compressor exit air 16 (combustor shell air) from the combustor section 30, which compressor exit air is bypassed around the combustor 42. The air bleed line 46 extends to the turbine section 14 and may branch off to separate air bleed branch lines 46b-d for supplying bleed air to the turbine section 14. That is, an air bleed branch line 46b may be in fluid communication with the second stage 28b and provide cooling air to the stationary vane 26b and associated components, an air bleed branch line 46c may be in fluid communication with the third stage 28c and provide cooling air to the stationary vane 26c and associated components, and an air bleed branch line 46d may be in fluid communication with the fourth stage 28d and provide cooling air to the stationary vane 26d and associated components. Flow of the compressor exit air through the air bleed line 46 may be controlled by suitable valving 48, which may be controlled by a suitable controller 50.

It should be understood that although the present invention is described with reference to a turbine section 14 having four stages, the invention may be implemented with turbine sections having additional stages. An additional air bleed branch line may be provided for each of such additional stages.

The air bleed line 46 may also be provided with a heat exchanger 52 in thermal communication with the air flowing through the line 46, i.e., via a bypass line 54 including the heat exchanger 52. Additional valving (not shown) may be provided to control flow of air to the heat exchanger 52 through the bypass line 54 and/or to control an amount of heat exchange between the heat exchanger 52 and air passing through the line 46 to the turbine stages 28b, 28c, 28d.

An additional flow of compressor exit air may bypass the combustor 42, as represented by line 56 in FIG. 2, and may be provided as cooling air to stationary components of the first stage 28a of the turbine section 14, as well as to the rotor 58. A portion of the rotor cooling air supplied by the flow of cooling air 56 may also be provided as cooling air to blades 22a, 22b, 22c, 22d mounted for rotation with the rotor 58. Alternatively, cooling air may be provided to the second and third stage blades 22b, 22c via associated stationary vanes 26b, 26c, as is additionally described below. The flow of cooling air represented by line 56 may also include a heat exchanger (not shown) for cooling the air prior to passing to the components of the first stage 28a, the rotor 58 and blades 22a-d.

Figure 3:
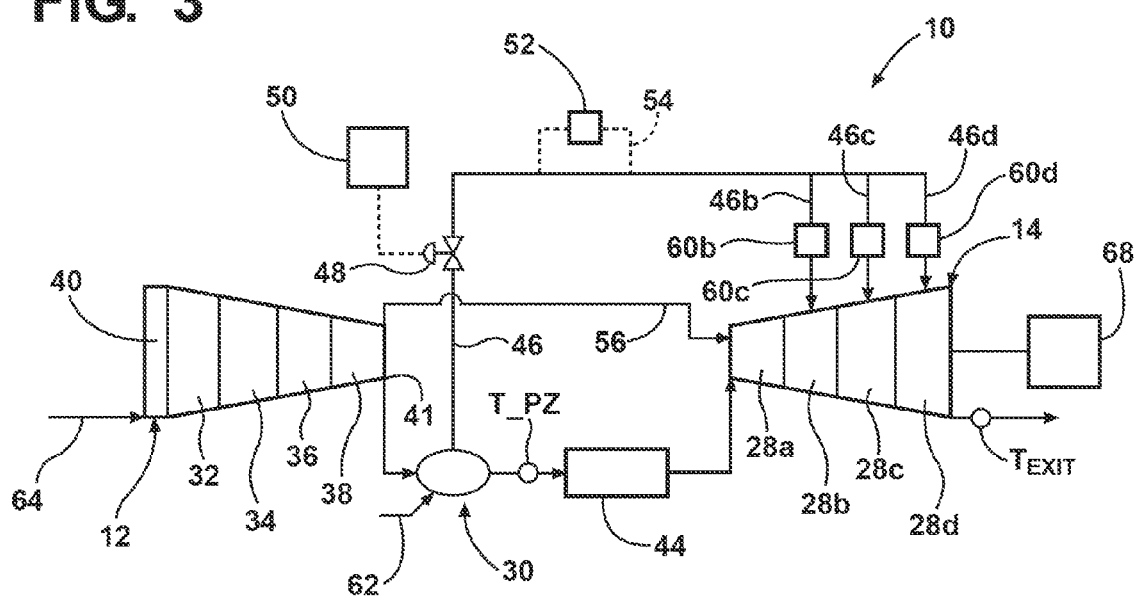
FIG. 3 is a schematic diagram of a turbine engine assembly illustrating an exemplary embodiment of the invention comprising an alternative configuration of the invention.

Referring to FIG. 3, an alternative configuration for cooling the air provided to the air bleed line 46 is shown for the turbine engine assembly 10. Specifically, a separate heat exchanger 60b, 60c, 60d may be provided to each of the air bleed branch lines 46b, 46c, 46d, respectively. Additional heat exchangers may be provided if the turbine section 14 includes additional stages, with an additional air bleed branch line and heat exchanger for each additional stage. The air bleed branch lines 46b, 46c, 46d may additionally be provided with suitable valving (not shown) to control flow of the bleed air through the heat exchangers 60b, 60c, 60d, which may be used to control the air flow through the heat exchangers 60b, 60c, 60d, and may provide control of bleed air temperature to the individual stages 28b, 28c, 28d. Such flow and temperature control may be implemented, for example, through the controller 50.

Figure 4:
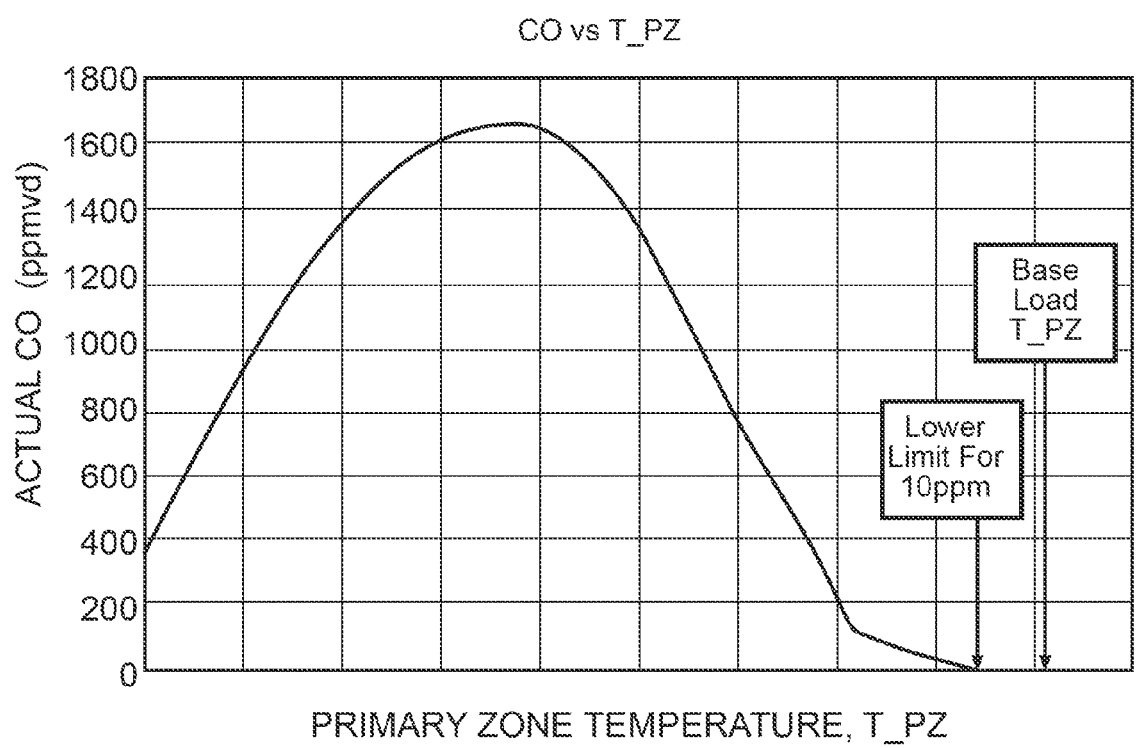
FIG. 4 is a graphical illustration of CO vs T_PZ.
Figure 5:
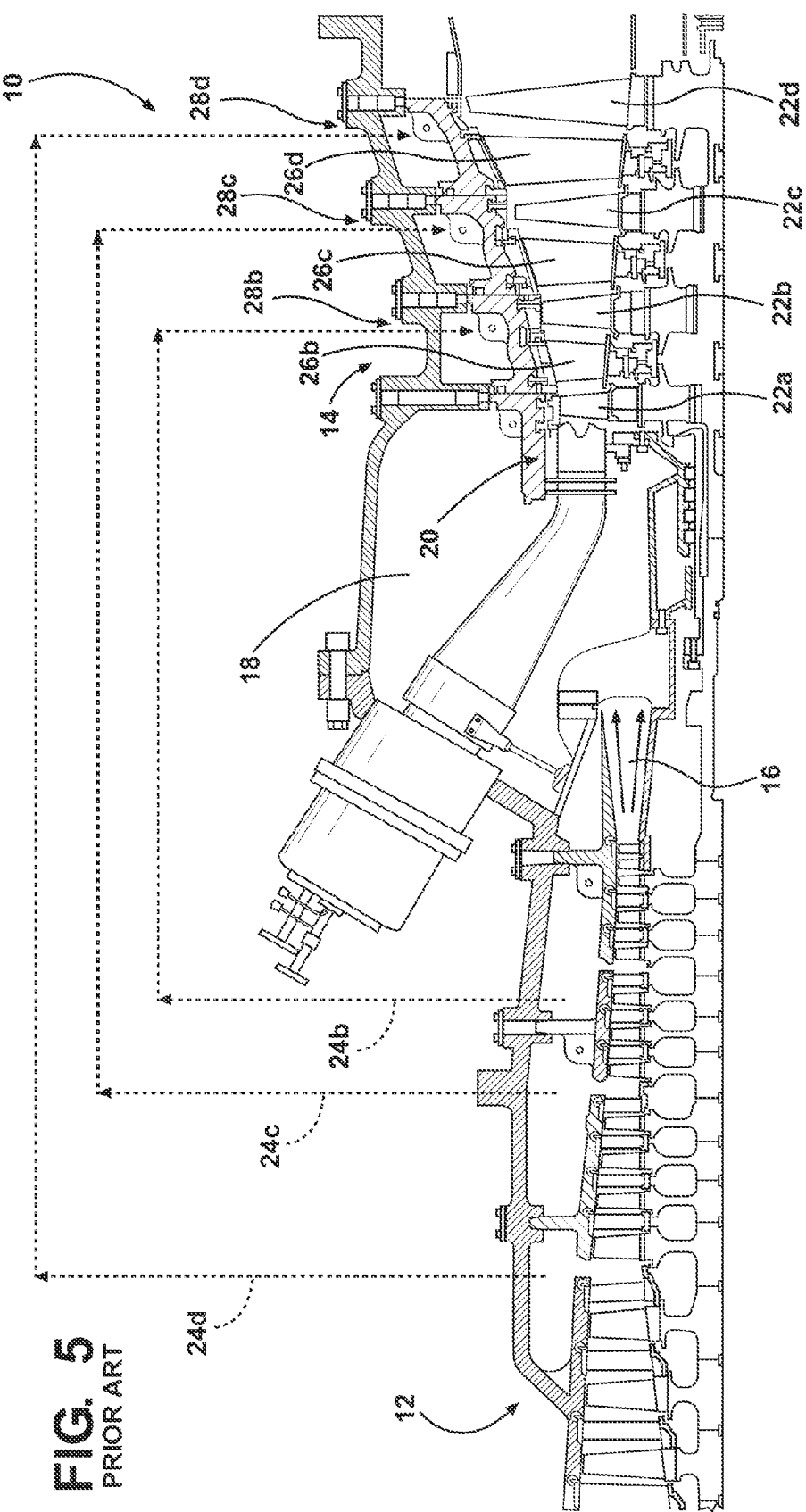
FIG. 5 is a cross-sectional view of a turbine engine assembly illustrating a prior art cooling arrangement.

In the combustor section 30, air is mixed with fuel, such as may be provided through one or more fuel lines 62, and combusted to produce hot, high pressure gas and reaction products including unburned hydrocarbons (UHC) and CO. It is desirable to keep CO emissions low, preferably less than 10 ppmvd at 15% $O_2$. As the load on the turbine engine assembly 10 is reduced, the fuel supply to the combustors is reduced. The IGVs 40 can be closed to a limit position as the fuel supply is reduced to limit the mass flow of air into the combustor section 30. Further reductions in power typically would require a reduction in the T_PZ, which would result in increased UHC and CO production (FIG. 4) due to the quenching of the combustion reactions in the turbine hot gas path as the air/fuel ratio increases. In typical turbine operation, CO can usually only be maintained at a low level (less than about 10 ppmvd at 15% $O_2$) above about a 60% load.

During low load operation of the turbine engine assembly 10, a CO reduction process may be implemented, including directing the compressor exit air 16 from the combustor shell 18 and into the air bleed line 46. Thus, the amount of air available for combustion in the combustor 42 is reduced, allowing a further reduction in power while maintaining the T_PZ at or above a minimum temperature with an acceptable level of CO production. During the CO reduction process, the compressor section 12 has compressed the bleed air that exits the combustor 30 through the air bleed line 46. The power required for this compression is supplied by the turbine 14 and, since the turbine power stays constant, less power is available to drive the generator or other load, i.e., the power is absorbed to facilitate low load operation. In accordance with a particular aspect of the invention, substantially all inlet air 64 to the compressor section 12 is compressed along the entire length of the compressor section 12 and exits as compressor exit air 16 at the combustor shell 18. That is, no bleed air is removed from the compressor section 12 upstream of the compressor exit 41, such that an optimum or maximum amount of work is put into the air passing through and exiting the compressor section 12, i.e., exiting at the compressor exit 41. Hence, a maximum amount of power is absorbed at the compressor section 12 by retaining the air entering the compressor section 12 to receive work through all stages of the compressor section 12.

Substantially all cooling air for the turbine section 14 comprises compressor exit air 16, i.e., supplied from the combustor shell 18. For example, all cooling air via the cooling air flow 56 and the air bleed line 46 may be supplied from the compressor exit air 16. The compressor exit air 16 comprises the highest available pressure and highest energy air from the compressor section 12 as a cooling bleed air supplied to the second stage vane 26b, third stage vane 26c, and fourth stage vane 26d at a high mass air flow. Further, as noted above the cooling air provided to the second and third stage vanes 26b, 26c may pass through corresponding second and third stage blades 22b, 22c, as depicted by dotted lines 66b and 66c (FIG. 1), respectively. That is, cooling air supplied through the second and third air bleed branch lines 46b, 46 may pass radially inwardly through the stationary vanes 22b, 26c to disk cavities 70, 72 located radially inwardly from the hot gas path 45, and may pass from the disk cavities 70, 72 radially outwardly through the second and third stage blades 22b, 22c, and thereafter discharge as dilution air into the hot gas path 45.

Providing a higher pressure air, with the most work put into it from the compressor section 12, maximizes the cooling air mass flow to the turbine section 12, providing an overcooling air flow to the second and third stages 28b, 28c (vanes and blades) and to the fourth stage vanes 26d. In addition to providing cooling to the turbine section components, the overcooling air flow supplied through the air bleed line 46 is discharged into the hot working gas to cool the working gas. The higher mass flow provided from the compressor exit air 16 provides a higher flow of cooling air into the hot gas stream for diluting the hot gas stream, decreasing the exit temperature $T_{EXIT}$, i.e., below a maximum exit temperature, to allow the combustor 42 to operate at a higher T_PZ for CO reduction. Hence, the increased cooling air mass flow provided through the air bleed line 46 permits a further decrease in power production by providing a decrease in the exit temperature $T_{EXIT}$, while maintaining the T_PZ above a minimum temperature as the flow of available air to the combustor 42 from the compressor section 12 is decreased.

The following presents an exemplary operation of the turbine engine assembly 10, providing cooling to the turbine section 14 during a CO reduction process. However, it should be understood that the present invention is not limited to the particular method or sequence of steps described herein. During a load reduction mode of operation of the turbine engine assembly 10, the IGVs 40 may be initially closed to a limiting position, and the air bleed line 46 may be subsequently opened to provide a further reduction of air flow into the combustor 42.

Control of the flow through the air bleed line 46 may be provided by the controller 50, which may be any suitable controller, such as programmable logic controller, a computer or the like, and can be a programmed function of the existing control system of the turbine engine assembly 10 or a separate controller as shown.

The valving 48 for the air bleed line 46 may be controlled by the controller 50 to progressively open, increasing the flow rate through the air bleed line 46 as the operating load is decreased, and thereby reducing power delivered to a generator 68 (FIGS. 2 and 3) while maintaining the T_PZ above a T_PZ lower limit. Additional control operations may be performed, such as opening IGVs before opening the valving 48 for the air bleed line 46, such as may be required to maintain stability in the airflow and combustion within turbine engine assembly 10. For example, the IGVs 40 may close initially as the load decreases, until about 60% load is reached, where the IGVs 40 are at a limit closed position. The IGVs 40 may then open as the load decreases further, and the air bleed line 46 may be opened. After the air bleed line 46 is fully open, further reductions in load can be accomplished by closing of the IGVs 40. As noted previously, the present example is merely exemplary, and other modes of controlling the low load operation of the turbine engine assembly 10 may be implemented without departing from the spirit and scope of the invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A turbine engine assembly for a generator, the assembly comprising:
   a turbine engine having a compressor section, a combustor section and a turbine section, the combustor section having a primary zone temperature (T_PZ) and the turbine engine having a base load;
   at least one air bleed line in communication with the combustor section for receiving bleed air comprising combustor shell air from the combustor section;
   the at least one air bleed line providing cooling air to stationary vanes in a second stage of the turbine section and providing cooling air to stationary vanes in third and fourth stages of the turbine section downstream from the second stage for discharging bleed air into a hot working gas passing through the turbine section;
   each of the second, third and fourth stages of the turbine section including blades mounted to a common rotor for the compressor section;
   at least one valve for controlling air flow through the at least one air bleed line;
   a controller for opening the at least one valve to allow bleed air to flow through the at least one air bleed line when an operating load is less than the base load to bypass air exiting the compressor section around a combustor in the combustor section and effect a flow of high pressure combustor shell air to the stages of the turbine section; and wherein all bleed air for cooling the second, third and fourth stages of the turbine comprises air that has passed from the compressor section to the combustor section to maximize the amount of power that is absorbed at the compressor section prior to passing to the second, third and fourth stages of the turbine section in combination with increasing bleed air flow into the hot working gas to effect in an increased reduction in the temperature of the hot working gas within the turbine section.

2. The turbine engine assembly of claim 1, including at least one heat exchanger for cooling the air flowing in the at least one air bleed line from the combustor section to the turbine section.

3. The turbine engine assembly of claim 2, including a separate air bleed branch line to each of the stages of the turbine section, and a separate heat exchanger in each air bleed branch line for separately cooling bleed air passing to each of the stages of the turbine section.

4. The turbine engine assembly of claim 1, wherein the bleed air provides overcooling to stationary vanes in the second, third and fourth stages of the turbine section thereby providing excess cooling air for discharging into the hot working gas.

5. The turbine engine assembly of claim 4, wherein at least a portion of the bleed air provided to the vanes in the turbine section subsequently passes through the blades of one or more stages of the turbine section.

6. The turbine engine assembly of claim 1, wherein a flow rate through the at least one air bleed line is increased as the operating load is decreased thereby reducing power delivered to the generator while maintaining the T_PZ above a T_PZ lower limit.

7. The turbine engine assembly of claim 6, wherein the T_PZ lower limit is selected so as to maintain CO production at less than about 10 ppmvd at 15% $O_2$.

8. A cooling system for a turbine engine operably coupled to a generator, the system comprising:
an air bleed line in communication with a combustor section of the turbine engine, and in communication with a turbine section of the turbine engine;
a flow control device for controlling flow through the air bleed line;
a controller for actuating the flow control device to allow bleed air to flow through the air bleed line and provide cooling air to the turbine section when an operating load is less than a base load of the turbine engine, wherein substantially all cooling air for the turbine section is obtained from compressor exit air exiting a compressor section of the turbine engine; and
wherein the bleed air comprises cooling air provided to a plurality of stages in the turbine section comprising a second stage and one or more subsequent stages of the turbine section defining a path for a hot working gas, each of the stages of the turbine section including blades mounted on a common rotor for the compressor section; and
an increasing bleed air flow being provided to the turbine section and discharged into the hot working gas with a decreasing load to effect an increased reduction in the temperature of the hot working gas within the turbine section.

9. The system of claim 8, wherein the bleed air comprises cooling air provided to a plurality of stages in the turbine section comprising said second stage and at least third and fourth stages of the turbine section.

10. The system of claim 8, including at least one heat exchanger for cooling the air flowing in the at least one air bleed line from the combustor section to the turbine section.

11. The system of claim 10, including a separate air bleed branch line to each of the stages of the turbine section, and a separate heat exchanger in each air bleed branch line for separately cooling bleed air passing to each of the stages of the turbine section.

12. The system of claim 8, wherein, when the operating load is less than a base load of the turbine engine, no bleed air is extracted upstream of the compressor exit.

13. A method of operating a turbine engine assembly comprising:
sensing a load on a turbine engine for a reduced operating load;
bleeding air from a combustor section of the turbine engine to provide bleed air to a turbine section of the turbine engine responsive to the reduced load, wherein substantially all bleed air for the turbine section is obtained from compressor exit air discharged from a compressor section of the turbine engine; and
wherein the bleed air comprises cooling air provided to a plurality of stages in the turbine section comprising a second stage and one or more subsequent stages of the turbine section defining a path for a hot working gas, each of the stages of the turbine section including blades mounted on a common rotor for the compressor section; and
an increasing bleed air flow being provided to the turbine section and discharged into the hot working gas with a decreasing load to effect an increased reduction in the temperature of the hot working gas within the turbine section.

14. The method of claim 13, further comprising passing the bleed air through at least one heat exchanger and removing heat from the bleed air.

15. The method of claim 14, wherein the turbine section includes said second stage and at least third and fourth stages receiving the bleed air, and including a heat exchanger associated with each of the stages and controlling the temperature of the bleed air going to each of the second, third and fourth stages.

16. The method of claim 13, wherein a flow rate through the at least one air bleed line is increased as the operating load is decreased thereby reducing power delivered to the generator while maintaining the T_PZ above a T_PZ lower limit.

17. The method of claim 16, wherein the T_PZ lower limit is selected so as to maintain CO production at less than about 10 ppmvd at 15% $O_2$.

18. The method of claim 13, wherein the compressor section of the turbine engine includes inlet guide vanes (IGVs) movable to a closed position to restrict air flow into the compressor section, and the method further comprises:
a) initially closing the IGVs as the load decreases; and
b) subsequently, at a predetermined reduced load, opening the IGVs while increasing the flow of bleed air from the compressor exit to the turbine section during a further decrease in the load.

19. The method of claim 18, wherein the predetermined reduced load is about 60% load.

20. The method of claim 19, wherein the IGVs are closed to a limit closed position when the 60% load is reached.

* * * * *